United States Patent
Nysetvold et al.

(10) Patent No.: US 10,108,774 B2
(45) Date of Patent: Oct. 23, 2018

(54) METHOD AND APPARATUS FOR CONCURRENT MULTI-USER TOOLPATH CREATION

(71) Applicant: Brigham Young University, Provo, UT (US)

(72) Inventors: Thomas Trevor Nysetvold, The Woodlands, TX (US); Jordan Lowell Johnson, Lindon, UT (US); Eric Joseph Wardell, Provo, UT (US); Charles Gregory Jensen, Provo, UT (US)

(73) Assignee: Brigham Young University, Provo, UT (US)

( * ) Notice: Subject to any disclaimer, the term of this patent is extended or adjusted under 35 U.S.C. 154(b) by 817 days.

(21) Appl. No.: 14/261,298

(22) Filed: Apr. 24, 2014

(65) Prior Publication Data

US 2014/0324212 A1    Oct. 30, 2014

Related U.S. Application Data

(60) Provisional application No. 61/815,945, filed on Apr. 25, 2013.

(51) Int. Cl.
*G06F 19/00* (2018.01)
*G06F 17/50* (2006.01)

(52) U.S. Cl.
CPC ...... *G06F 17/5086* (2013.01); *G06F 2217/04* (2013.01)

(58) Field of Classification Search
None
See application file for complete search history.

(56) References Cited

U.S. PATENT DOCUMENTS

| | | | |
|---|---|---|---|
| 5,278,953 A | 1/1994 | Saxon et al. | |
| 6,064,759 A | 5/2000 | Buckley et al. | |
| 7,542,817 B2 * | 6/2009 | St. Ville | A61F 2/30942 700/118 |

(Continued)

OTHER PUBLICATIONS

Waggoner, Using Cad, CAM and Rapid Prototyping Technologies to model parts for electrical Manufacture, IEEE, 2003, pp. 75-78.*

(Continued)

*Primary Examiner* — Diem Cao
(74) *Attorney, Agent, or Firm* — Kunzler, PC

(57) ABSTRACT

A method for generating a toolpath includes providing a plurality of machining target models based on a model of an engineering object, assigning the machining target models to CAM clients operated by users, receiving a machining instruction sequence from each CAM client, and machining a part by executing each of the machining instruction sequences on one or more machine tools. The machining instruction sequences may be merged into a single machining instruction sequence before being executed by a machine tool. The machining target models may be created manually or automatically generated. In certain embodiments, the machining target models are generated by spatially partitioning the model of the engineering object. In one embodiment, features that are allocated to a separate machining process are removed from the machining target models. A corresponding apparatus is also disclosed herein.

15 Claims, 7 Drawing Sheets

(56) References Cited

U.S. PATENT DOCUMENTS

| | | | | |
|---|---|---|---|---|
| 8,401,687 B2* | 3/2013 | Kohlhoff | ................ | G06T 19/00 |
| | | | | 700/105 |
| 2002/0183878 A1* | 12/2002 | Chartier | ........... | G05B 19/41805 |
| | | | | 700/98 |
| 2006/0106485 A1* | 5/2006 | Landers | ............. | G05B 19/4097 |
| | | | | 700/182 |
| 2008/0221840 A1* | 9/2008 | Bassi | .................... | G06F 17/509 |
| | | | | 703/1 |
| 2012/0110595 A1 | 5/2012 | Reitman et al. | | |
| 2012/0317497 A1* | 12/2012 | Red | ........................ | G06F 17/50 |
| | | | | 715/751 |

OTHER PUBLICATIONS

Choi et al, A dynamic priority-based approach to concurrent toolpath planning for multi-material layered manufacturing, Elsevier, 2010, pp. 1095-1107.*

PCT/US2014/035357, International Search Report and Written Opinion, dated Sep. 23, 2014.

PCT/US2014/035357, International Preliminary Report on Patentability, dated Oct. 27, 2015.

* cited by examiner

METHOD AND APPARATUS FOR CONCURRENT MULTI-USER TOOLPATH CREATION

CROSS-REFERENCE TO RELATED APPLICATIONS

This application claims the benefit of U.S. provisional application 61/815,945 entitled "Multi-User Toolpath Design" and filed on 25 Apr. 2013. The foregoing application is incorporated herein by reference.

BACKGROUND

1. Technical Field

The subject matter disclosed herein relates generally to systems and methods for creating toolpaths for computer controlled manufacturing.

2. Discussion of the Background

In industrial workflows the design process typically results in a CAD model that represents the desired final state of a part. Toolpath generation software bridges the gap between CAD models and CNC processes. Despite the use of software tools, toolpath generation is often a very time-consuming process that is typically performed by a single expert user. Thus toolpath generation represents a significant bottleneck in current design workflows.

Concurrent engineering approaches to toolpath creation have been discussed in the literature. However, in current systems a single user must still design the toolpath for each part, creating a significant bottleneck effect. Another concurrent engineering approach involves the creation of custom programs to generate toolpath based on parametric designs, as in, for example, Ching et al. This is again valuable, especially for parts that must be repeated and optimized, but it increases the time required to set up the first toolpath and thus actually exacerbates the single-user bottleneck. Prior art approaches to concurrent CAM offer little help for the single-user bottleneck. In this context, it becomes clear that a more collaborative method for toolpath generation could offer significant economic benefit.

A complex part might consist of dozens or hundreds of faces and holes and require the use of several different machines, each with many different tools, each of which progressively make rough, semi-finished, and finish machining passes. Furthermore, the original model is often designed with little acknowledgment of the process required to generate the toolpaths, so the model does not necessarily include adequate definition of the part stock or intermediate stages of manufacturing. Industry practices often involve handing the design model to a single expert individual and waiting weeks or months for him or her to finish the opaque, time-consuming process of defining toolpaths.

Furthermore, the toolpath generation phase of product development typically sits squarely on the critical path between designing a product and getting the product to market and can be a significant source of delay in the development cycle.

Given the foregoing, what is needed is a collaborative and concurrent engineering method to reduce the time required for toolpath generation and thus reduce the single-user bottleneck. The embodiments disclosed herein were developed in response to these issues.

SUMMARY OF THE INVENTION

The subject matter disclosed herein enables multiple users to concurrently generate machining sequences for manufacturing a single part. For example, a method for generating a toolpath includes providing a plurality of machining target models based on a model of an engineering object, assigning the machining target models to CAM clients operated by users, receiving a machining instruction sequence from each CAM client, and machining a part by executing each of the machining instruction sequences on one or more machine tools. The machining instruction sequences may be merged into a single machining instruction sequence before being executed by a machine tool. The machining target models may be created manually or automatically generated. In certain embodiments, the machining target models are generated by spatially partitioning the model of the engineering object. In one embodiment, features that are allocated to a separate machining process are removed from the machining target models. A corresponding apparatus is also disclosed herein.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
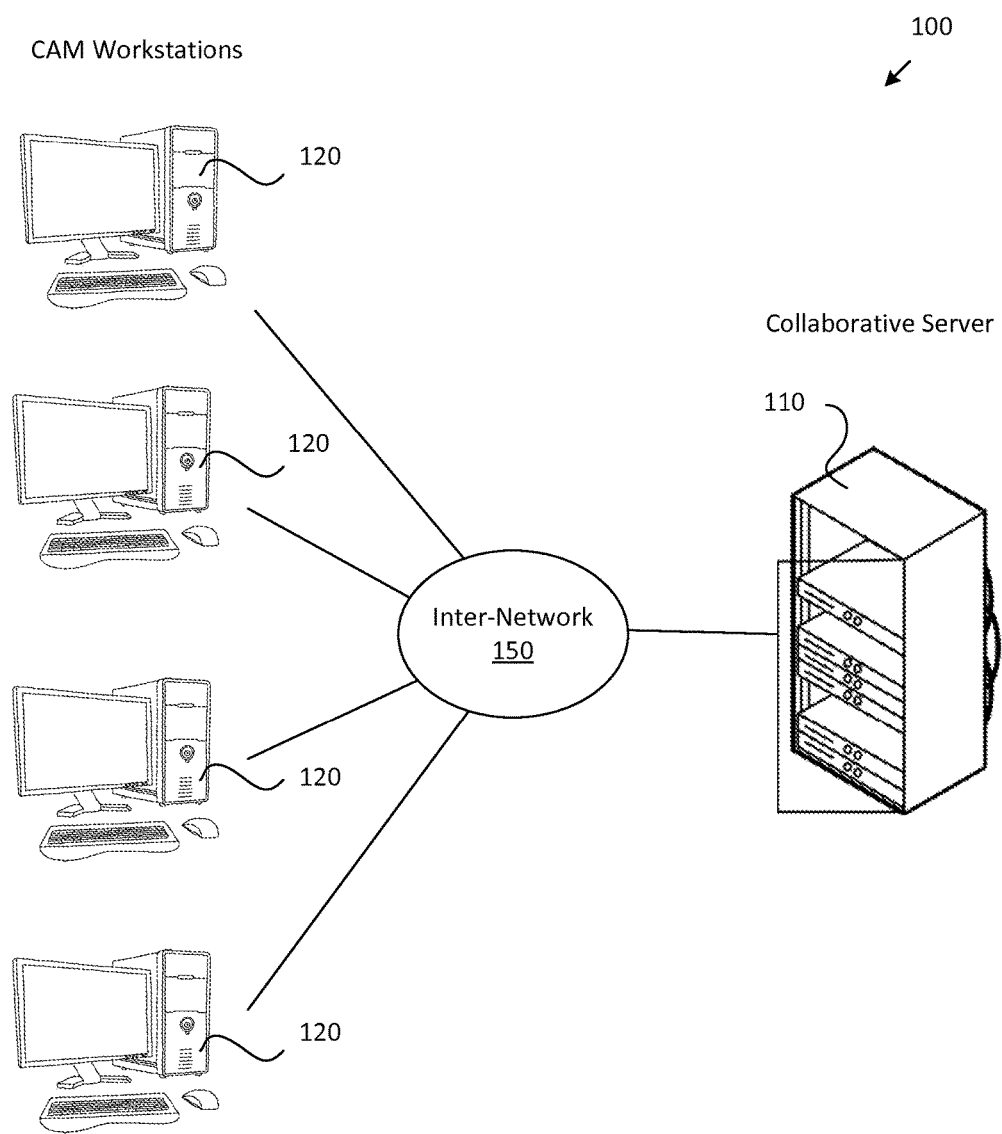
FIG. 1 is a schematic drawing of a multi-user toolpath creation system including a collaborative server and multiple CAM clients.

Some of the functional units described in this specification have been labeled as modules, in order to more particularly emphasize their implementation independence. Others are assumed to be modules. For example, a module or similar unit of functionality may be implemented as a hardware circuit comprising custom VLSI circuits or gate arrays, off-the-shelf semiconductors such as logic chips, transistors, or other discrete components. A module may also be implemented with programmable hardware devices such as field programmable gate arrays, programmable array logic, programmable logic devices or the like.

A module or a set of modules may also be implemented (in whole or in part) as a processor configured with software to perform the specified functionality. An identified module may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, enable the module to achieve the intended purpose for the module.

Indeed, the executable code of a module may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any tangible form capable of enabling execution of a program of machine-readable instructions on a digital processing apparatus. For example, a computer readable medium may be embodied by a flash drive, compact disk, digital-video disk, a magnetic tape, a magnetic disk, a punch card, flash memory, integrated circuits, or other digital processing apparatus memory device. A digital processing apparatus such as a computer may store program codes, associated data, and the like on the computer readable medium that when retrieved enable the digital processing apparatus to execute the functionality specified by the modules.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic drawing of a multi-user toolpath creation system 100 that includes a collaborative server 110, multiple CAM clients 120, and an inter-network 150. The collaborative server 110 may include a server with a single processor, a server with multiple processors, or a server cluster. The multi-user toolpath creation system 100 allows multiple users to work concurrently on creating toolpaths to be used in manufacturing a single part, reducing the time required for toolpath creation and improving time-to-market.

In one embodiment, the collaborative server 110 stores geometric data used in the toolpath creation process, and distributes the geometric data to the various users at the CAM clients 120. The CAM clients are typically workstations each with an instance of software capable of CAM such as Siemens NX, CATIA, MasterCam, and the like. The software may be provided by a single vendor, or be from multiple vendors.

The term workstation, as used herein, means one or more devices at which a user could work, with means for displaying information such as a computer monitor or the like, means to obtain user input such as keyboard, touchscreen or mouse, and means to execute software such as a local processor(s), remote processors(s), or a combination thereof.

The term toolpath, as used herein, means a set of machining instructions that are executed on a machine tool to manufacture a part. The toolpath may be described in a generic form within the CAM software and converted to a G-Code form that is specific to one type of machine tool, either of which we will refer to using the term toolpath or sequence of machining instructions.

The inter-network 150 may include a wireless network such as Wi-Fi, a wired network, Internet, or combination of other networks for communicating data. In one embodiment, the inter-network 150 is the internet. In another embodiment, the inter-network 150 is a virtual private network (VPN).

Figure 2:
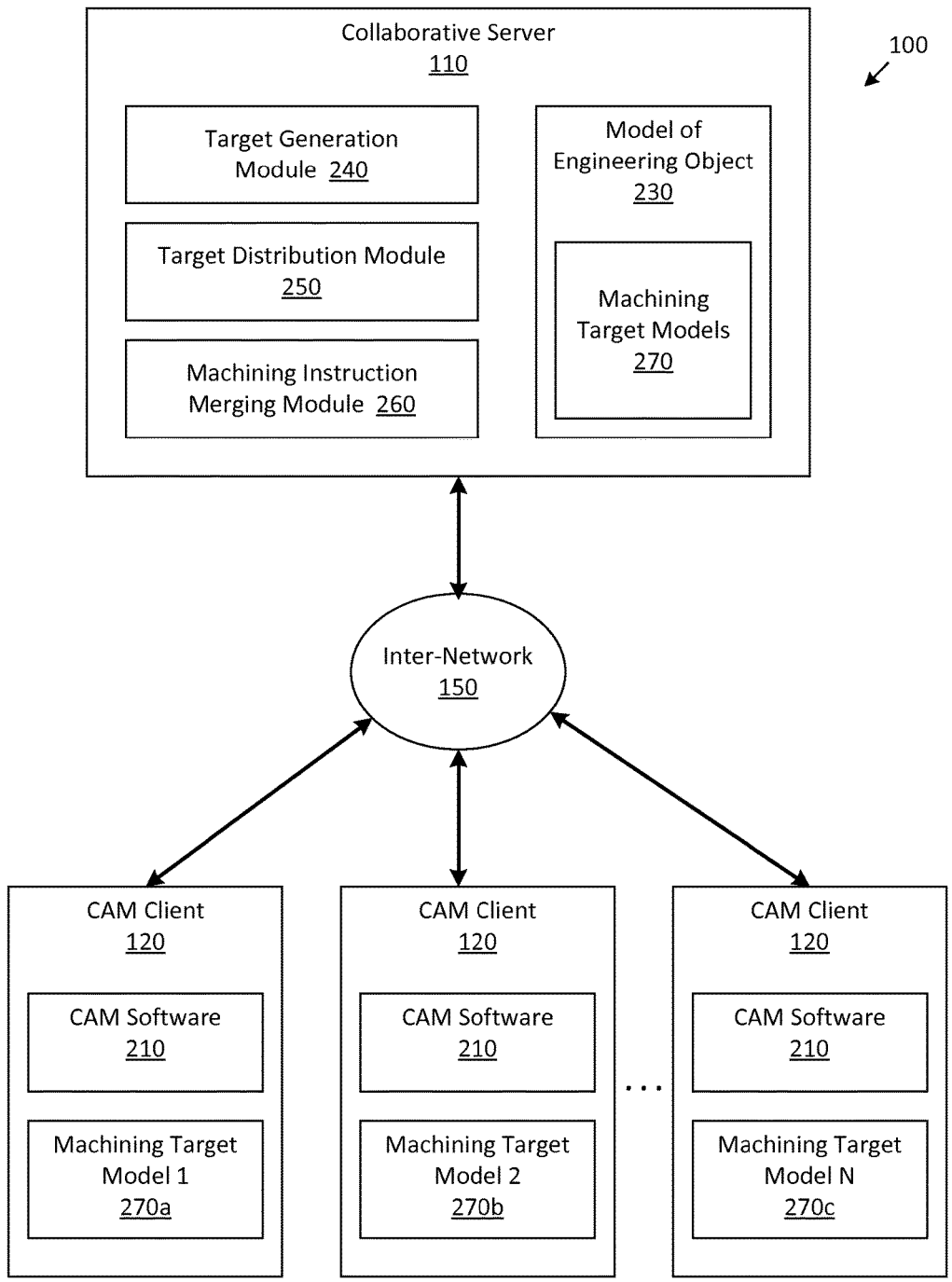
FIG. 2 is a functional block diagram depicting one embodiment of the multi-user concurrent toolpath creation system including a collaborative server and multiple CAM clients.

FIG. 2 is a functional block diagram depicting one embodiment of the multi-user concurrent toolpath creation system 100 depicted in FIG. 1 that includes a collaborative server 110 and multiple CAM clients 120.

The collaborative server 110 may include a model of an engineering object 230 including machining target models 270, a target generation module 240, a target distribution module 250, and a machining instruction merging module 260. The model of an engineering object 230 may be a solid, a surface, a tessellated and/or mixed hybrid digital part, or any other digital representation known to those of skill in the art. The machining target models 270 may be individual models based on the model of the engineering object 230 created by the target generation model 240. The target distribution module 250 may distribute the machining target models 270 to the individual CAM clients 120. In one embodiment, the modules shown on the collaborative server 110 may instead be located on one of the clients 120. The machining instruction sequences (that define the toolpaths for a machine tool) produced by the CAM clients may be merged into a single machining instruction sequence by the machining instruction merging module 260. The merging is done in such a way as to generate a legal and functional merged toolpath.

In one embodiment, the machining target models 270 each have a target surface that defines the desired output of a machining operation. Machining operations may include, for example, roughing, final roughing, semi-finishing, and finishing machining passes. A model may serve as a desired endpoint for one CAM client as well as a starting point for the next CAM client in the sequence by providing the state of the material targeted to be removed by the previous machining pass. For example, the desired endpoint for one CAM client may be provided as a layer representing the part stock geometry within the machining target model 270 of another CAM client. In general, in the sequence of machining target models 270, each specifies additional material removed from the previous, until the final model specifies the intended surface for the part.

In some embodiments, one or more of the machining target models 270 may be spatially restricted to a certain section of the model of the engineering object 230. Creating target models by spatially partitioning the model 230 enables a greater number of models to be created thus a greater number of users to work simultaneously on the CAM toolpath creation. The spatial partitioning may be carried out so the spatial regions have logical joint boundaries that can be machined properly, such as a boundary on a flat surface or a boundary at the edge of a pocket. For example, a model might be divided to three sections with each section having three machining target models, so in this example up to nine users could be concurrently programming CAM toolpaths for the same part. In another example, a model is partitioned into four spatially distinct regions, and the four machining target model 270 target surfaces match the model geometry in each region. In this example, four users would be working concurrently creating toolpaths for the part, and the toolpaths created for each region could include roughing passes as well as finishing passes.

The implementation details of several embodiments of the machining target models will be discussed further in FIGS. 4 through 7. Providing predefined machining target models to each CAM client enables the toolpaths to be created concurrently and independently of the each other.

The machining instruction sequences produced by the CAM clients may be merged into a single machining instruction sequence by the machining instruction merging module 260. The merging is done in such a way as to generate a legal and functional merged toolpath. For a group toolpaths created from machining target models 270 created from spatially partitioned regions of the model 230, the merging module 260 may be configured to combine the portions of toolpaths for each machining pass from each region together in the merging process to minimize tool changes during machining. For a group of toolpaths created from target models 270 that are not spatially partitioned but each target corresponds to a roughing or finishing machining pass over the whole part, the merging module 260 may be configured to append the toolpaths together into a merged toolpath.

The CAM client 120 may include CAM software 210 and a machining target model 270. The user at the CAM client 120 operates the CAM software 210 to create a machining instruction sequence that will result in the part being machined to the desired endpoint specified by the machining target model 270. The machining target model 270 may be further comprised of a part stock model layer. The part stock model layer defines a starting point for the machining pass, or in other words the preexisting material at the start of the machining process. In some embodiments, the part stock model may be separate models that are associated with each machining target model 270.

Figure 3:
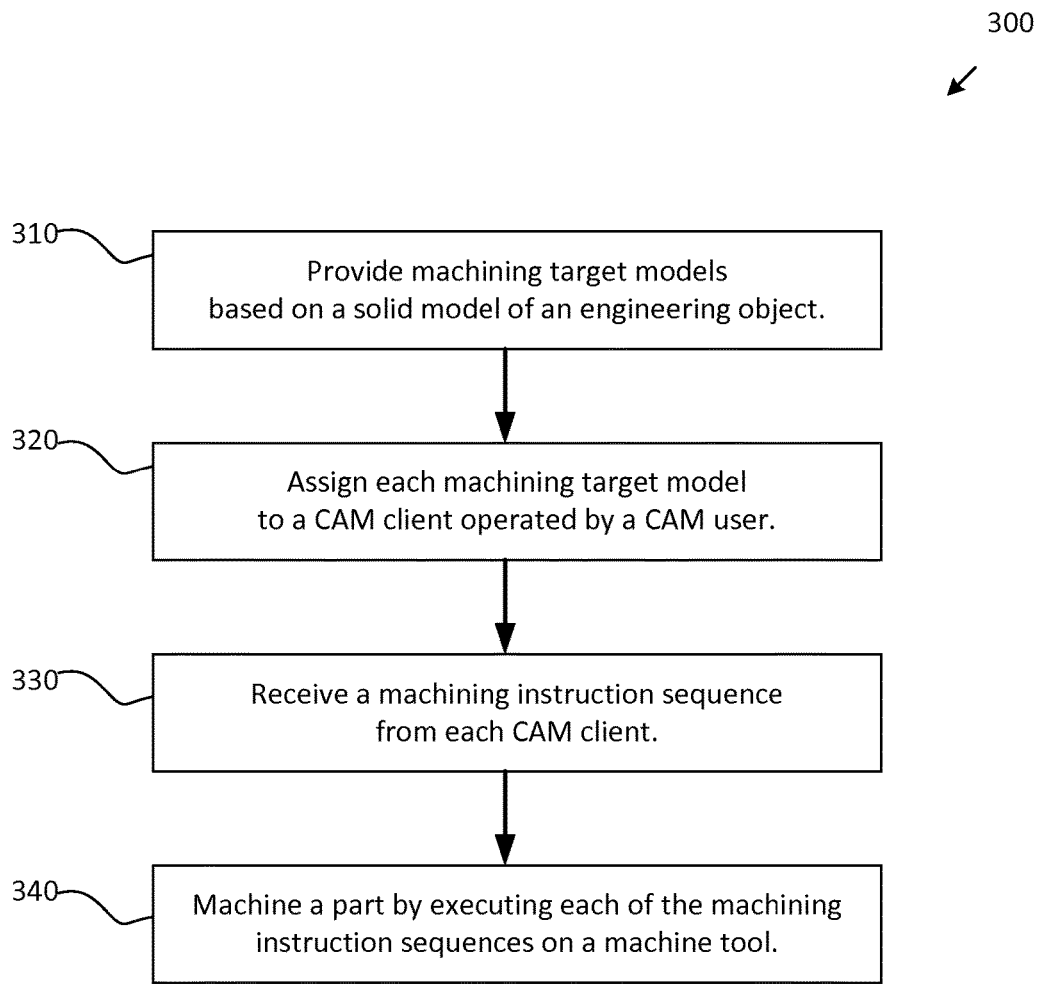
FIG. 3 is a flowchart depicting one embodiment of a method for creating a part utilizing concurrent multi-user toolpath creation.

FIG. 3 is a flowchart depicting one embodiment of a part creation method 300. As depicted, the part creation method 300 includes providing 310 machining target models based on a model of an engineering object, assigning 320 each machining target model to a CAM client 120 operated by a CAM user, receiving 330 a machining instruction sequence from each CAM client, and machining 340 a part by executing each of the machining instruction sequences on a machine tool. The method 300 enables the toolpaths for a series of machining passes to be created concurrently, reducing the total time required to create the toolpaths for machining a part compared to single-user prior art methods.

Providing 310 machining target models based on a model of an engineering object may include creating a series of machining target models 270. In some embodiments, the machining target models 270 are generated automatically by the target generation module 240. In other embodiments, the creation of the machining target models 270 is performed manually using CAD modeling software. In one embodiment, the machining target models 270 are stored as individual layers within a single model, and each CAM client utilizes the same model file but works from different layer inside the model file.

Assigning 320 each machining target model to a CAM client operated by a CAM user may include communicating the machining target model 270 to the CAM client 120. In one embodiment, the communication is performed automatically by the target distribution module 250. In other embodiments, the communication of the machining target models is initiated manually. In the case where the machining target models are layers combined into a single model, each CAM client receives the combined model along with a corresponding layer identifier. Once the CAM client has the machining target model, the user operates the software to create a sequence of machining instruction sequences (i.e. toolpaths) which will cut the part to the specification embodied in the machining target model 270 when executed on an appropriately configured machine tool.

Receiving 330 a machining instruction sequence from each CAM client may include receiving a file transferred from each CAM client containing the machining instruction sequence that was generated corresponding to the machining target model 270 assigned to that CAM client. The file transfer may be initiated by the machining instruction merging module 260, or the file transfer may be initiated manually by a user.

Machining 340 a part by executing each of the machining instruction sequences on a machine tool may include operating one or more machine tools to machine a part by executing the machining instruction sequences, with the sequences being executed in appropriate order with the finishing machining pass or passes executed last. In one embodiment, the machining instruction sequences are combined into a single machining instruction sequence by the machining instruction merging module 260. In other embodiments, the sequences are not combined but are executed individually one after another.

Figure 4:
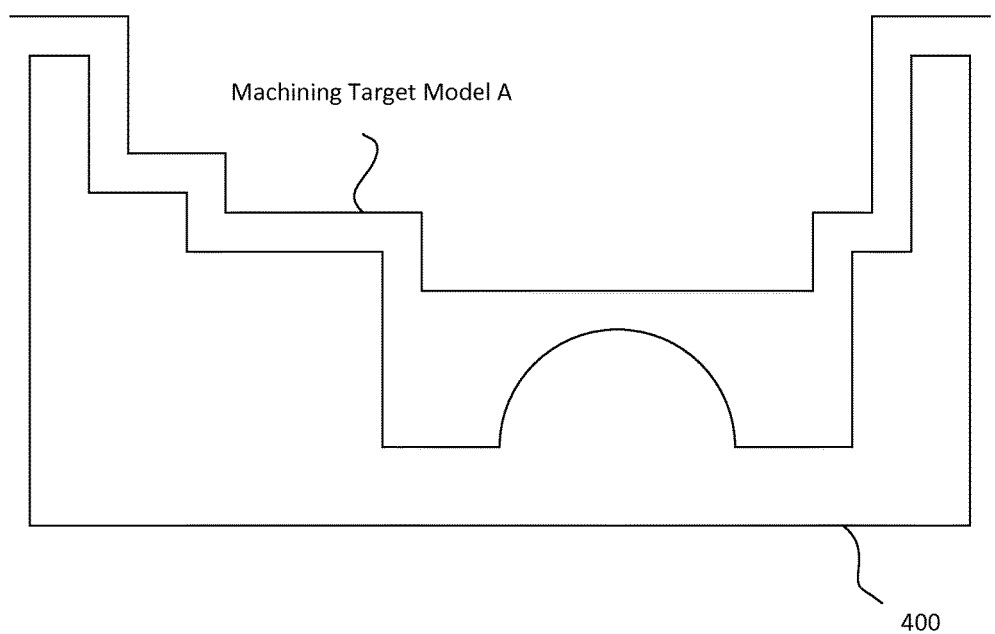
FIGS. 4 through 6 depict a 2-D cross-section an example model of an engineering object with cross sections of machining target models A, B, and C overlaid; and, FIG. 7 depicts a 2-D cross-section of an example model of an engineering object that has been spatially partitioned into three regions.
Figure 5:
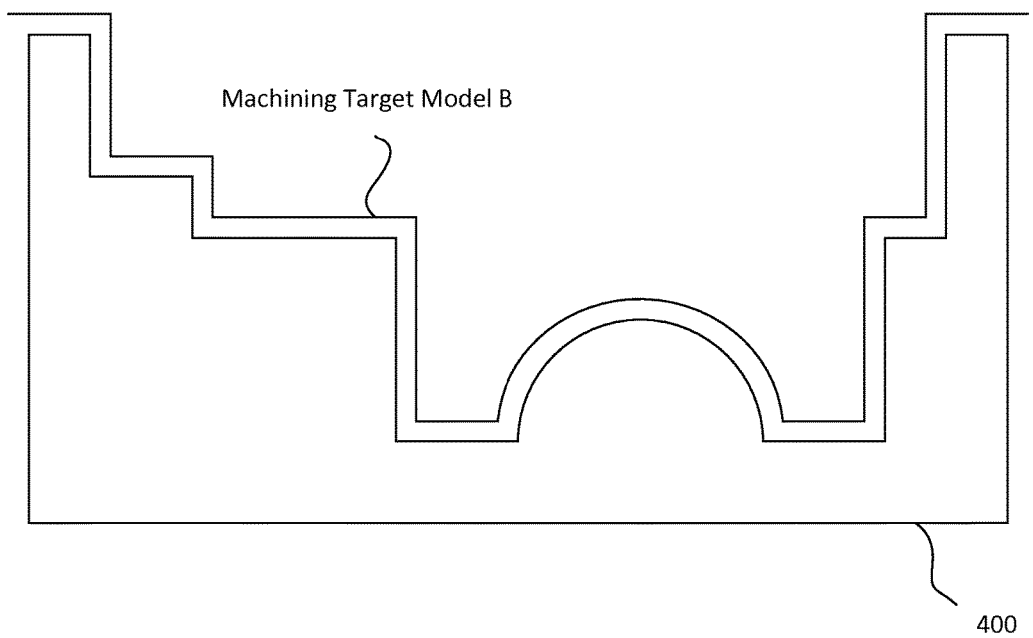
Figure 6:
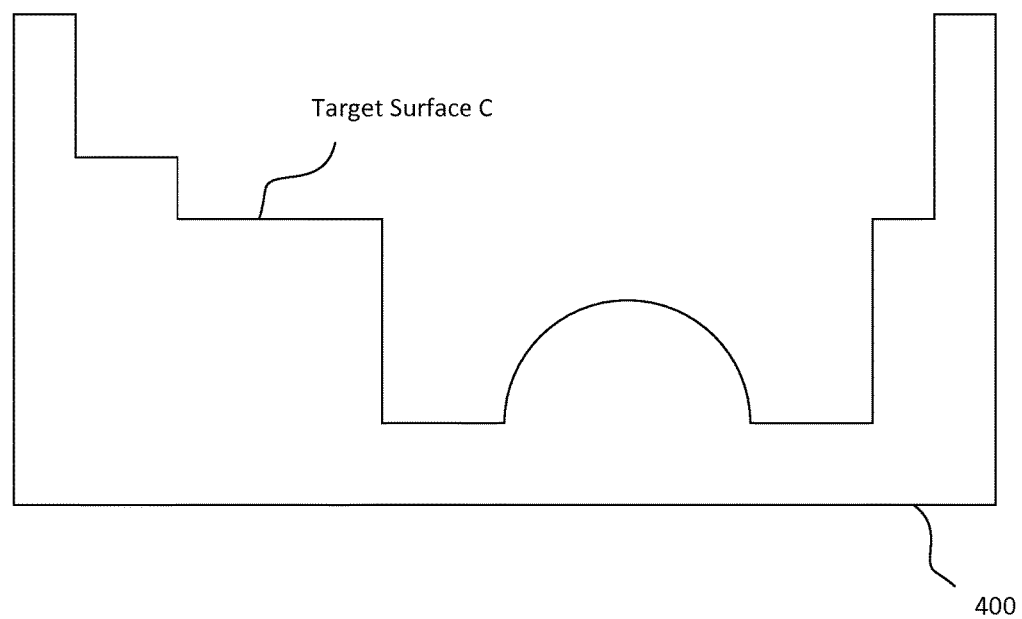

FIGS. 4 through 6 depict a 2-D cross-section an example model of an engineering object with cross sections of machining target models A, B, and C overlaid. FIGS. 4 and 5 depict a 2-D cross-section of the example model 400 with target model surface A and B shown respectively as overlays and FIG. 6 depicts the same model 400 cross section, which also functions as a machining target model C. To machine the part, the machining instructions to machine to target model A would be executed first, B second, and C third. These three targets could be thought of as the target for the first roughing machining pass, the target for a semi-finishing machining pass, and the actual model (target C) is the target for the final finishing machining pass. For the purposes of discussion, the surface for target B is defined in this example to be a surface that is a constant distance from the model surface. The surface for target A does not contain as much detail as it is intended to be machined using a larger diameter tool.

Figure 7:
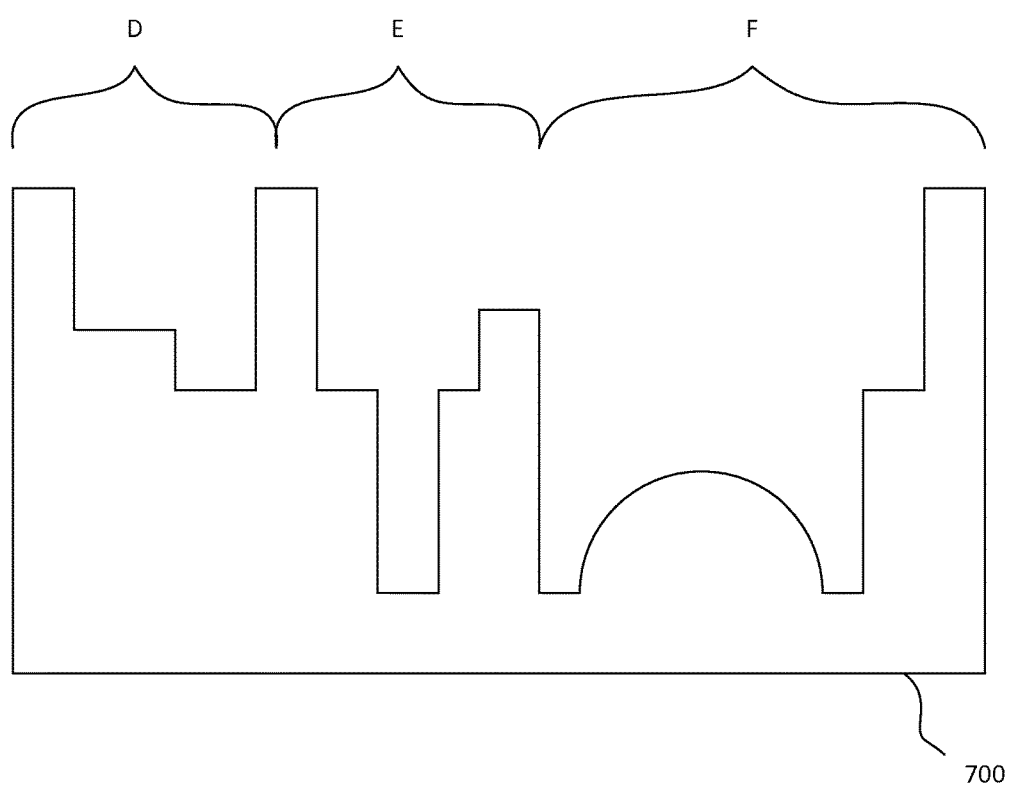

FIG. 7 depict a 2-D cross-section of an example model of an engineering object that has been spatially partitioned into three regions. As depicted, the cross-section of the model of the engineering object 700 is shown with three distinct regions, labeled D, E, and F. In this example, the toolpaths for the roughing through finishing passes for each region D, E, or F could be created by a single CAM user or by multiple users.

Although one skilled in the art of machining and toolpath programming could create a logical set of machining target models, some additional detail on how the model creation could be accomplished are disclosed herein as follows: In some embodiments, so as to be efficient in the roughing machining pass, the target for a roughing pass is created in such a way as to not be overly detailed, for example where no inside diameter is less than a predetermined value, which enables the machining to be carried out with tools all of a radius larger than the predetermined value. The radius so restricted may be tangential to the cutting tool for the case of a flat end mill, or may be a restriction on any inside radius for in the case of a ball end mill.

In certain embodiments, the machining target models comprise a surface and a tolerance value, specifying that the cut surface must be within the tolerance value on either side of the surface. In other embodiments, the machining target model comprises two machining target surfaces, one which defines the surface which all material must be removed on one side of the surface, and a second surface which defines a surface past no material must be removed.

In some embodiments, prior to the creation of the machining target models 270 the model may be simplified by the removal of features if these features are to be created with a subsequent specialized machining operation, for example on a completely different type of tool.

When creating the machining target models 270, whether through a spatial partitioning or a series roughing and finishing target models, or a combination thereof, it may be desirable that the machining instruction sequence for each machining target model be completed at approximately the same time. For example, one way to accomplish this would be to create more machining target models 270 than there are users, so after each user completes the toolpath creation for a model they start on another, thus minimizing the chances of one model being the "long pole" in the process. In another embodiment, heuristics are used to estimate the time required to generate the toolpaths for each of the machining models, and the models are assigned in such a way that the anticipated effort required for each matches the time available and abilities of the users receiving the model(s) so that the toolpaths will be completed at approximately the same time.

In summary, the methods, apparatuses, and systems presented herein provide a number of distinct advantages over prior art methods, apparatuses, and systems. It should be noted that many of the functional units described herein are identified as modules. Others are assumed to be modules. Others are assumed to be modules. One of skill in the art will appreciate that the various modules described herein may include a variety of hardware components that provide the described functionality including one or more processors such as CPUs or microcontrollers, or programmable logic devices (i.e., hardware components) that are configured by one or more software components. The software components may include executable instructions or codes and corresponding data that are stored in a computer-readable storage medium such as a non-volatile memory, or the like. The instructions or codes may include machine codes that are configured to be executed directly by the processor. Alternatively, the instructions or codes may be configured to be executed by an interpreter, or the like, that translates the instructions or codes to machine codes that are executed by the processor.

It should also be understood that this description is not intended to limit the invention. On the contrary, the exemplary embodiments are intended to cover alternatives, modifications, and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method comprising:
providing a plurality of machining target models corresponding to a corresponding plurality of distinct machining operations for a part, wherein each machining target model is based on an engineering model of the part and defines a desired output of a distinct machining operation of the corresponding plurality of distinct machining operations;
assigning the plurality of machining target models to a corresponding plurality of CAM clients operated by a corresponding plurality of users;
receiving a machining instruction sequence from each CAM client to provide a plurality of machining instruction sequences, wherein each machining instruction sequence is created independently at each CAM client and corresponds to a distinct machining operation of the corresponding plurality of distinct machining operations;
merging the plurality of machining instruction sequences into a single machining instruction sequence by overlapping two or more machining instruction sequences; and
machining the part by executing the single machining instruction sequence on one or more machine tools.

2. The method of claim 1, wherein the plurality of machining targets correspond to a plurality of machining offsets.

3. The method of claim 1, wherein a machining target model of the plurality of machining target models comprises a minimum target surface and a maximum target surface that respectively define a surface that all material must be removed to, and a surface that no material must be removed beyond.

4. The method of claim 1, wherein a machining target model of the plurality of machining target models comprises a target surface and a machining offset that together define a surface that all material must be removed to, and a surface that no material must be removed beyond.

5. The system of claim 1, wherein a machining target model of the plurality of machining target models is created automatically with a machining model creation module.

6. The method of claim 1, wherein a machining target model of the plurality of machining target models is created manually.

7. The method of claim 1, wherein a machining target model of the plurality of machining target models is created so that the model has no tangential inside radius smaller than a predetermined value.

8. The method of claim 1, wherein a machining target model of the plurality of machining target models is created so that the model has no inside radius smaller than a predetermined value.

9. The method of claim 1, wherein an execution order for the plurality of machining instruction sequences proceeds from a machining target model with the most extraneous material to the machining target model with the least extraneous material.

10. The method of claim 1, wherein a machining target model of the plurality of machining target models comprises a surface substantially identical to the surface of the engineering model of the part.

11. The method of claim 1, wherein a machining target model of the plurality of machining target models omits features allocated to a separate machining process.

12. The method of claim 1, wherein a machining target model of the plurality of machining target models is created automatically.

13. The method of claim 1, wherein the plurality of machining target models are generated by spatially partitioning the engineering model of the part.

14. An apparatus comprising:
at least one processor;
a target distribution module configured to distribute a plurality of machining target models corresponding to a corresponding plurality of distinct machining operations for a part to a plurality of CAM clients configured to concurrently create machining instruction sequences based on the machining target models, wherein each machining instruction sequence is created independently at each CAM client and corresponds to a distinct machining operation of the corresponding plurality of distinct machining operations;
a machining instruction merging module configured to merge the plurality of machining instruction sequences into a single machining instruction sequence by overlapping two or more machining instruction sequences; and
wherein each machining target model defines a desired output of a distinct machining operation of the plurality of distinct machining operations.

15. The apparatus of claim 14, further comprising a target generation module configured to automatically generate the plurality of machining target models.

* * * * *